United States Patent [19]

Booth et al.

[11] 4,226,344
[45] Oct. 7, 1980

[54] CONSTANT FLOW VALVE ACTUATOR

[75] Inventors: Jack J. Booth; William C. Branch; Robert P. Kidd, all of Dallas, Tex.

[73] Assignee: Booth, Inc., Carrollton, Tex.

[21] Appl. No.: 10,083

[22] Filed: Feb. 6, 1979

Related U.S. Application Data

[63] Continuation-in-part of Ser. No. 876,001, Feb. 8, 1978.

[51] Int. Cl.³ .................. F16K 31/11; F16K 11/16
[52] U.S. Cl. ................................ 222/504; 251/130; 137/607; 141/360; 91/453
[58] Field of Search ............. 251/130; 137/602, 607; 91/453; 222/504; 141/360, 361, 362

[56] References Cited

U.S. PATENT DOCUMENTS

| | | | |
|---|---|---|---|
| 2,925,988 | 2/1960 | Ray | 251/130 X |
| 3,027,132 | 3/1962 | Smith | 251/130 X |
| 3,448,769 | 6/1969 | Cornelius | 251/130 X |
| 3,667,724 | 6/1972 | Cornelius | 251/130 X |
| 3,759,485 | 9/1973 | Mills | 91/453 X |

*Primary Examiner*—Arnold Rosenthal
*Attorney, Agent, or Firm*—Richards, Harris, Medlock

[57] ABSTRACT

A dispensing valve mechanism which includes means for automatically maintaining a constant flow of fluid through a flow channel under varying fluid source pressure utilizes a piston movable within a chamber in response to fluid pressure to regulate the available flow area of a single outlet port in the chamber. The piston is sized to permit fluid flow around the periphery of the piston, and may have an axial flow path therethrough to serve as the primary flow path through the valve mechanism. A spring yieldably opposes axial movement of the piston that would tend to decrease the effective area of the chamber outlet port. An adjustment screw is carred in the valve body for adjusting the force exerted by the spring. The valve is particularly suited for use in liquid dispensing apparatus. The valve mechanism is operated by a pivoted arm which includes a projection thereof that engages an electrical switch which causes a solenoid to open the valve. The arm further includes a transverse member which mechanically engages a lever to open the valve.

8 Claims, 3 Drawing Figures

CONSTANT FLOW VALVE ACTUATOR

This is a continuation-in-part application of pending application Ser. No. 876,001 filed Feb. 8, 1978.

TECHNICAL FIELD

The present invention relates to a valve mechanism for regulating the flow of fluid through a conduit, and more particularly relates to an actuator for operating a valve mechanism which automatically maintains a uniform flow of fluid under varying pressure.

BACKGROUND ART

Flow control mechanisms which are adjustable to provide a proportionally variable rate of fluid flow in response to changes in fluid pressure heretofore have utilized a piston disposed within a chamber. The piston is movable within the chamber and is biased by a spring toward the inlet of the chamber. Pressurized fluid introduced through the inlet port in the chamber acts against the biasing force of the spring to move the piston axially within the chamber. The extent of axial movement within the chamber is dependent upon the fluid pressure acting against the piston at the inlet of the chamber. Fluid exits from the chamber through a plurality of outlet ports, with the rate of flow through the outlet ports being regulated by the extent to which the piston blocks the outlet ports. Accordingly, axial movement of the piston within the chamber constitutes a shutter mechanism that varies the degree of openness of the outlet ports in response to the fluid pressure at the inlet of the chamber. Typical is the regulator shown in U.S. Pat. No. 2,984,261.

In valve mechanisms of the type described, the flow of fluid introduced into the chamber through the inlet generally passes through an opening that extends through the interior of the piston to the outlet ports. Accordingly, it has been the case that leakage between the piston and chamber wall has been sought to be eliminated. Either a diaphragm arrangement or a piston-cylinder combination having very close tolerances is required to prevent flow around the outside of the piston. However, the use of sealing mechanisms between the piston and chamber wall restricts axial movement of the piston and reduces the responsiveness of the valve mechanism to slight variations in pressure.

To overcome the leakage by machining the piston to an outside diameter and the chamber wall to an inside diameter of close tolerances as a practical matter, is cost prohibitive.

Another approach taken in an attempt to solve the leakage problem is that of utilizing a resilient diaphragm disposed between the piston and the chamber wall wherein the flow of fluid is directed by the diaphragm from the inlet of the chamber to the interior of the piston. Erickson, U.S. Pat. No. 3,422,842, discloses such a valve mechanism wherein a diaphragm is secured between the movable piston and the chamber wall. The diaphragm prevents the flow of fluid from the inlet around the exterior of the piston.

Valve mechanisms that regulate the flow of fluid therethrough in response to the pressure of the fluid have many applications. However, the present invention is particularly suitable for employment in apparatus that dispense carbonated beverages, particularly where such beverages are mixed in situ from carbonated water and a syrup.

The source of pressurized fluid for input into the valves described above is generally controlled by a direct mechanical connection. This type of connection generally does not provide the rapid on/off response and reliability required in a system for dispensing beverages.

DISCLOSURE OF THE INVENTION

In accordance with the present invention, there is provided a mechanism for deflecting a lever connected to open a valve for allowing a pressurized fluid to flow therethrough to a nozzle. The mechanism includes an arm rotatable about a pivot and having a paddle joined to the lower end thereof, the paddle adapted to receive the force to cause the arm to rotate about the pivot. An elongated member is joined transversely to the arm above the pivot opposite from the paddle, the elongated member being adapted to engage the lever to thereby open the valve when the arm is rotated about the pivot. A projecting member is joined to the arm above the transverse member and pivots for engaging and operating an electrical switch when the arm is rotated about the pivot. A solenoid assembly is linked to the lever and opens the valve when the electrical switch is operated by the projecting member.

In accordance with a further aspect of the present invention, the electrical switch is operated to open the valve in advance of the mechanical operation by the transverse member when the arm is rotated from an initial position about the pivot. The valve is normally operated by means of the solenoid but is operated manually by rotation of the arm when electrical power is not available to operate the solenoid.

DESCRIPTION OF THE DRAWINGS

A more complete appreciation of the invention may be had by reference to the accompanying drawings, illustrating a preferred embodiment of the invention to be described in detail, wherein.

DETAILED DESCRIPTION

Figure 1:
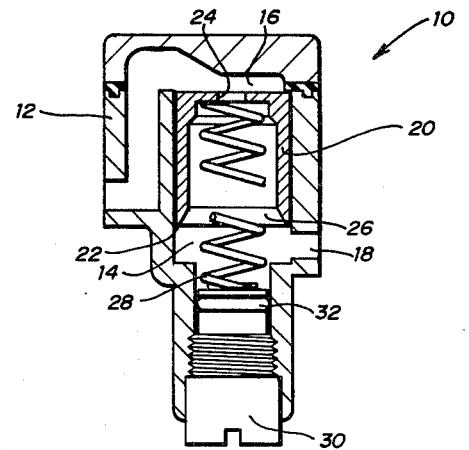
FIG. 1 is a cross-sectional view of a valve mechanism in accordance with the present invention.

Referring now to FIG. 1, there is shown a regulator valve mechanism 10 that is operable to automatically maintain a uniform rate of flow of a fluid through a flow channel under varying fluid source pressure conditions. Valve mechanism 10 has a valve body 12 that is of a generally elongate cylindrical shape. A chamber 14 defined by an elongate cylindrical bore is formed within the upper portion of valve body 12. Chamber 14 has an inlet port 16 into which fluid is introduced under the varying pressure of the fluid source. Valve body 12 further includes a single outlet port 18 through the side wall thereof.

A piston 20 is disposed within chamber 14. Piston 20 is also of a generally cylindrical configuration, with an annulus 22 being defined between the skirt portion of piston 20 and the inside wall surface of chamber 14. Piston 20 is sized to permit fluid flow around its periphery through the annulus. The primry flow path through valve mechanism 10 is, however, through an axial flow path through the interior of piston 20. More particularly, piston 20 has an opening 24 in the piston head to permit the introduction of fluid entering chamber inlet 16 into the hollow interior of piston 20. The flow entering piston 20 through opening 24 exits through the open skirt bottom area 26.

It will be appreciated that the flow capacity through opening 24 in piston 20 is of a lesser capacity than the flow capacity of inlet 16. Accordingly, upon the introduction of fluid to chamber inlet 16, piston 20 is axially displaced downstream within chamber 14 by the pressure at inlet 16. Means, such as spring 28, is provided for yieldably opposing axial movement of piston 20 in the downstream direction. The skirt portion of piston 20 acts as a shutter to close a portion of outlet port 18 to fluid flow in response to the fluid pressure acting on the head portion of piston 20 to regulate fluid flow through the chamber outlet port.

Accordingly, as the pressure of the fluid source increases, a greater force is applied to the head of piston 20 causing it to move further downstream against the opposing force of spring 28. Downstream movement of piston 20 causes the lower skirt portion thereof to block at least a portion of chamber outlet port 18 and reduce the available flow area of that port. Because only a single outlet is provided, the piston is forced against the side of the cylinder where the single outlet is located. The flow produces the forces which causes radial displacement. This causes a contact of knife edge character at the critical point where flow regulation takes place. If the pressure of the fluid source decreases, the force exerted by spring 28 urges the piston upstream and results in an increase in the available flow area through port 18.

Adjustment of the force exerted by spring 28 in opposition to axial downstream movement of piston 20 is provided by screw 30 that is engaged in threads formed in the lower portion of valve body 12. A seal 32 is also provided to prevent leakage of fluid around adjustment screw 30. It will, of course, be appreciated that valve mechanism 10 is calibrated and set up for a particular fluid flow rate through chamber outlet port 18 in response to the existence of a certain fluid pressure at the chamber inlet port 16 by adjustment of screw 30 to either increase or decrease the force exerted by spring 28.

Figure 2:
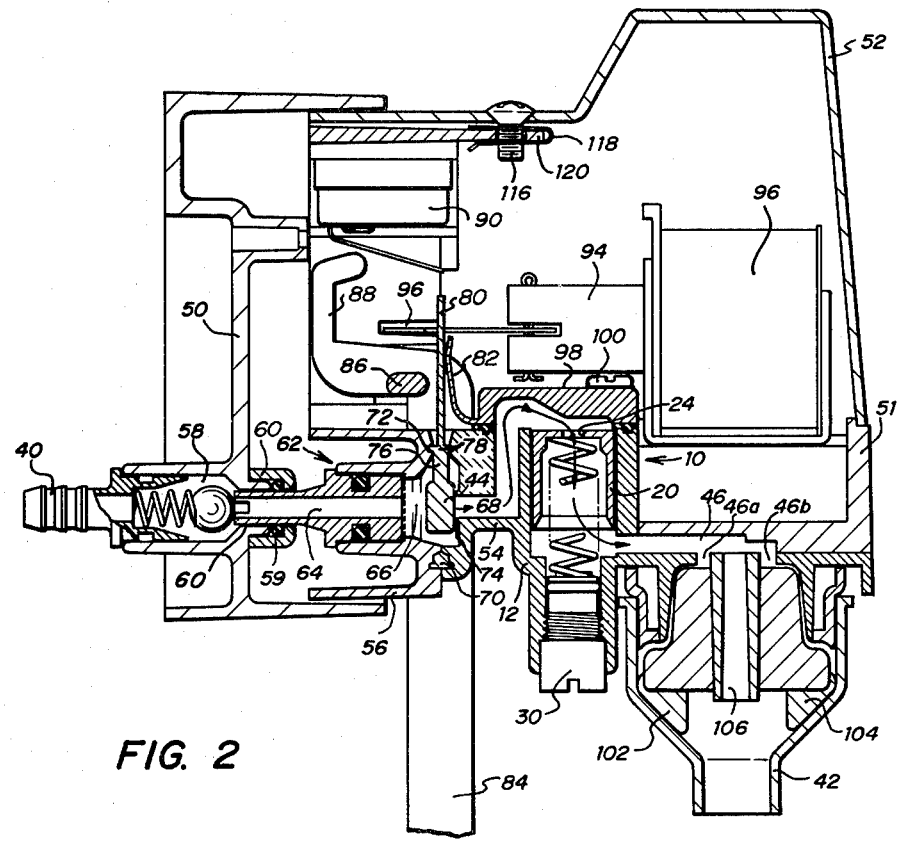
FIG. 2 is a cross section of the valve shown in FIG. 1 as utilized in a liquid dispensing apparatus.

Referring now to FIG. 2, valve mechanism 10 of FIG. 1 is shown being utilized as an element of a liquid dispensing apparatus wherein a flow channel is selectively opened from a closed condition to permit fluid flow from a source of varying pressure to a dispensing nozzle. Liquid dispensing apparatus of the type shown is typically used for the dispensing of such items as carbonted beverages which require a constant flow rate of the ingredients to assure a proper drink mixture.

Valve mechanism 10 is disposed in a flow channel that originates from a product input fitting 40 connected to a source of liquid to be dispensed through a nozzle 42, which liquid source is of a varying pressure. In addition, the liquid dispensing apparatus incorporates means, such as an actuatable control element 44, upstream from vlave mechanism 10 for introducing the pressurized fluid input to the apparatus through fitting 40 to the inlet of valve 10. Further, the dispensing apparatus includes means, such as conduit 46, for directing the regulated flow away from the outlet port of the valve mechanism to nozzle 42.

In the liquid dispensing apparatus shown in FIG. 2, the various component parts are mounted within a multiple part housing that includes a quick disconnect section 50 and a cover section 52. The housing covers a multi-part body portion of the liquid dispensing apparatus that includes the valve mounting body portion 54 and portion 56 that mounts the control element 44 and its actuator mechanism.

With particular reference to the quick disconnect section 50 at the rear of the liquid dispensing apparatus, a disconnect check valve 58 is provided downstream of the product-in nozzle 40. Check valve 58 is actuated to an open position upon the positioning of quick disconnect section 50 onto portion 56 of the liquid dispenser apparatus body, wherein the nozzle portion 60 of filter section 62 causes the opening of check valve 58. Quick disconnect section 50 permits the source of input fluid to the dispensing apparatus to be quickly and easily changed, as for example when a valve unit requires service, it can be quickly disconnected and replaced with a new valve.

Body portion 56 defines another portion 64 of the flow channel through the dispensing apparatus. Flow channel portion 64 includes filter fitting 62, which is mounted in a molded annular opening in body portion 56. Flow channel 64 empties into a cavity area 66 that is jointly formed by body portions 54 and 56, and within which control element 44 is disposed.

Body portion 54 defines another flow channel portion 68 to be in fluid communication with cavity area 66. Cavity 66 formed by the body portions 54 and 56 is sealed against fluid leakage at the intersection of the two body portions by seal 70.

The intersection of the body portions 54 and 56 further define a recessed circular groove 72 for mounting control element 44 within cavity 66. Control element 44 is a sealing member that comprises a rubber cap adapted for seating around orifice 74 that leads to flow channel 68 in body portion 54. An extension 76 having a grommet-like fitting 78 at the end is formed onto the main body portion of control element 44. An elongated arm extends through extension 76 and into the main body portion of control element 44. The cap portion of control element 44 is kept in a sealing engagement with the seating surface around orifice 74 by spring member 82 that acts on member 80 to pivot the cap portion of control element 44 about a pivot point defined by grommet 78.

Control element 44 is backed away from its sealing engagement with orifice 74 by movement of member 80 against the opposing force of spring member 82. For effecting movement of member 80 to uncover orifice 74, an actuator arm 84 is pivotally mounted in the body structure comprised of body portions 54 and 56. Actuator arm 84 is utilized in manual operation to effect movement of control element 44 by the use of a transverse member 86 mounted at the upper end of arm 84 in a position to engage member 80.

In addition, member 80 can be actuated by an electrical system. An L-shaped extension 88 at the extreme upper end of actuator arm 84 is adapted for engaging the actuator lever of microswitch 90 which controls the supply of electric current to solenoid 92. Energization of solenoid 92 results in armature 94 being drawn inwardly toward the solenoid, whereupon linkage 96 engages member 80 pulling it forward against the resisting force of spring member 82. As arm 82 is displaced from nozzle 42, extension 88 engages microswitch 90 before transverse member 86 engages member 80. Therefore, when electrical current is provided to solenoid 92, member 80 will be activated before engagement by transverse member 86. This is the preferred mode of operation, but when electrical current is not available, mechanical operation through transverse member 86 will be accomplished without the need for any changes being made to the valve actuation mechanism.

Once control element 44 has been actuated into the open position, uncovering orifice 74, pressurized fluid supplied to cavity 66 can enter flow channel 68 and be routed to the inlet of valve mechanism 10. In the liquid dispensing apparatus shown, the body portion 12 of valve mechanism 10 is integrally molded with body portion 54. A cylinder head 98 held in position over body portion 54 by screw 100 is configured to provide a portion of flow channel 68 that directs the flow of fluid toward opening 24 in piston 20.

Flow exiting from valve mechanism 10 directed through flow channel portion 46 that is formed within the forward portion of body portion 54. Fluid flow in flow channel portion 46 is split by two separate openings 46a and 46b to direct fluid into nozzle 42. Separated fluid flow through flow channel openings 46a and 46b is recombined in nozzle 42 after passage through respective interconnected flow channels 102 and 104. Additional ingredients may be supplied for mixing with the fluid that is routed through channels 102 and 104 by another flow channel 106 that is disposed centrally of nozzle 42. Accordingly, the liquid dispenser apparatus shown in FIG. 2 is ideally suitable for the dispensing of carbonated beverages wherein carbonated water is mixed within nozzle 42 with a syrup.

Figure 3:
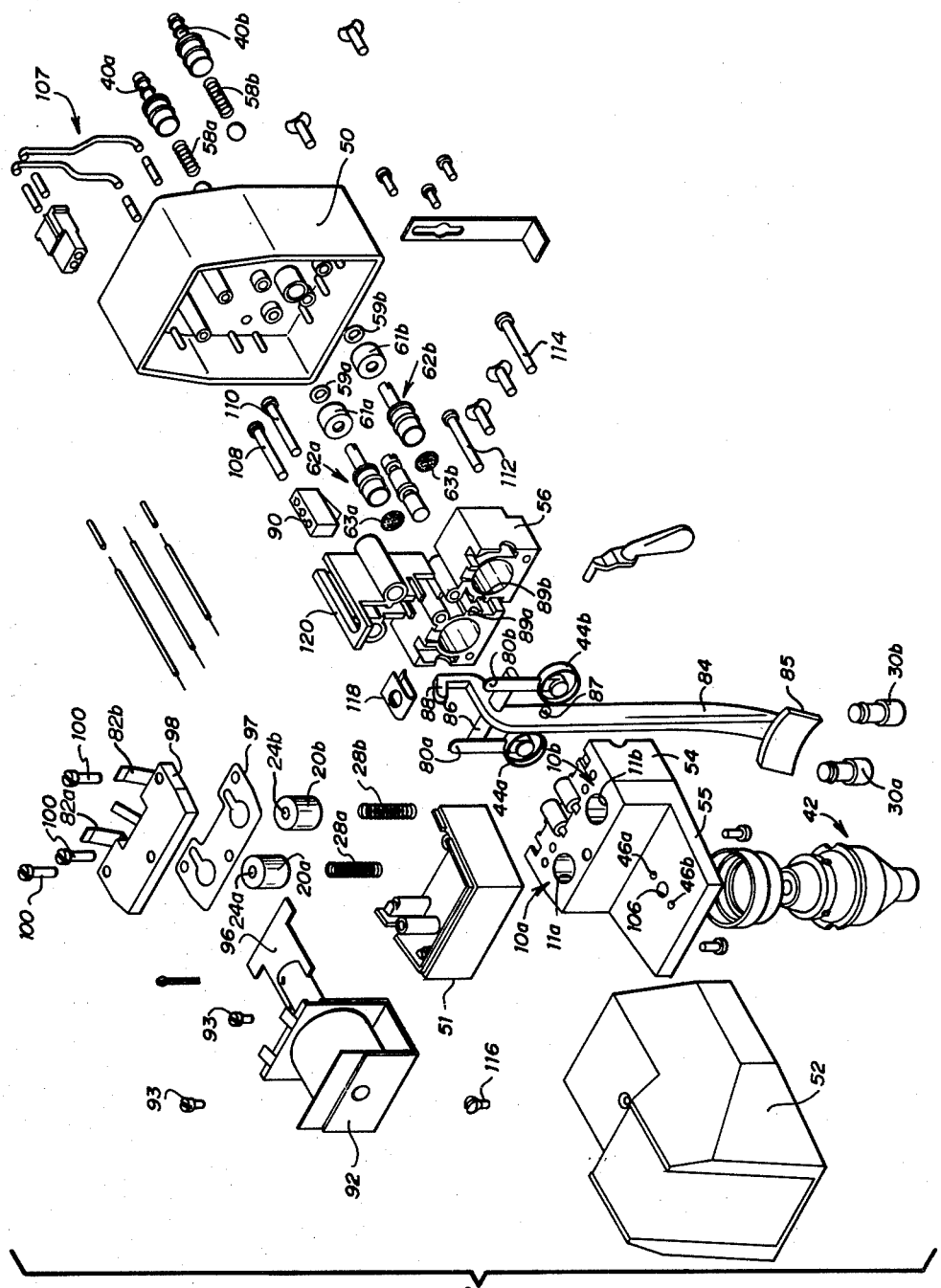
FIG. 3 is an exploded view of an overall liquid dispensing apparatus that utilizes the valve mechanism shown in FIG. 1.

Referring now to FIG. 3, an exploded view of the liquid dispensing apparatus shown in cross section in FIG. 2 is presented to give more complete details of the apparatus. As shown in FIG. 3, the liquid dispensing apparatus actually includes two product flow paths, for example, one for carbonated water and one for syrup. Therefore, the cross section view of FIG. 2 represents only one-half of the overall liquid dispenser apparatus. As shown in FIG. 3, the quick disconnect section 50 includes receptacles for accommodating the electrical wiring generally indicated by the reference numeral 107. In addition to the electrical wiring connections, quick disconnect section 50 includes product-in nozzles 40a and 40b, each of which includes a ball check valve 58a and 58b. Respective O-ring seals 59a and 59b are held in position by retaining caps 61a and 61b. The entire quick disconnect assembly, as best shown in FIG. 2, is positioned over body portion 56.

Body portion 56 is a one-piece molded component adapted for mating engagement with molded body section 54. Body sections 54 and 56 are held together by screws 108, 110, 112 and 114.

Filter fittings 62a and 62b are carried in molded body portion 56, with screens 63a and 63b being provided to filter unwanted particulate matter from the flow of fluid that passes through the flow channel of the dispensing apparatus. Actuator arm 84, shown with paddle portion 85 on the lower end for engaging a cup to be filled from nozzle 42, is journaled by placement of pivot pin 87 into trunnions defined by mating semi-circular trunnion portions formed in body portions 54 and 56. In the view in FIG. 3, the semi-circular trunnion portions 89a and 89b are formed in body portion 56.

Referring now to body portion 54, first and second valve mechanisms 10a and 10b are disposed within that body section. Body portion 54 has chamber bore openings 11a and 11b formed therein. Coil spring 28a and piston 20a are disposed in bore 11a, and coil spring 28b and piston 20b are disposed in bore 11b. Head member 98 is then secured by screws 100 to the top of body portion 54 with a gasket 97 disposed in between. Pistons 20a and 20b correspond to the piston 20, FIG. 1, and have openings 24a and 24b corresponding to opening 24.

The frontal portion of the dispensing apparatus includes housing portion 51 adapted to be placed on top of the forwardly extending portion 55 of body portion 54. Housing portion 51 is formed to accept and mount solenoid assembly 92, which is held in position thereon by screws 93. The top housing cover section 52 is held in position over the frontal portion of the dispensing apparatus by a screw 116 that is received into clip 118. The manner of attachment of clip 118 onto the forward extension 120 is further shown in FIG. 2.

The foregoing description of the invention has been directed to a particular preferred embodiment of the present invention for purposes of explanation and illustration. It will be apparent, however, to those skilled in this art, that many modifications and changes in the apparatus may be made without departing from the scope and spirit of the invention. It is therefore intended that the following claims cover all equivalent modifications and variations as fall within the scope of the invention as defined by the claims.

We claim:

1. A mechanism for actuating a lever connected to open a valve for allowing a pressurized fluid to flow therethrough to a nozzle, comprising in combination:
    (a) an arm movable about and depending from a pivot at a position behind and extending below said nozzle,
    (b) first means connected to said arm above said pivot for operating an electrical switch when said arm is rotated about said pivot,
    (c) a solenoid assembly linked to said lever and electrically connected to said switch for opening said valve when said switch is operated, and
    (d) a second means connected to said arm above said pivot for engaging said lever to open said valve when said arm is rotated about said pivot beyond the point at which said switch is actuated for manual operation of said valve in event of electrical failure.

2. A mechanism as recited in claim 1 wherein said first means and said second means are located on the same extension of said arm above said pivot.

3. A mechanism as recited in claim 1 wherein said first means is positioned to activate said electrical switch in advance of said second means engaging said lever for opening said valve when said arm is rotated about said pivot from an initial position where said valve is closed.

4. A mechanism as recited in claim 1 wherein said second means is an elongate member joined transversely to said arm.

5. A mechanism as recited in claim 1 wherein said first means is an integral segment of said arm projecting above said pivot to operate said switch.

6. A mechanism for opening a valve by deflecting a lever connected thereto, comprising in combination:
    (a) a vertical unitary arm rotatable about a central pivot and having a paddle joined to the bottom end thereof, said paddle adapted to receive a horizontal force to rotate said arm about said pivot, (b) an upward projecting portion of said arm above said pivot positioned to operate an electrical switch when said arm is rotated about said pivot,
(c) a switch and a solenoid assembly linked to said lever and electrically connected to said switch for opening said valve when said switch is operated, and
(d) an elongate transverse member joined to said arm above said pivot and below said switch, said elongate member adapted to engage said lever to open said valve when said arm is further rotated about said pivot in event of electrical failure.

7. A mechanism as recited in claim 6 wherein said switch is positioned to be operated by said projecting member prior to said elongate member opening said valve when said arm is rotated about said pivot from an initial position.

8. A mechanism as recited in claim 6 wherein said projecting member is a U-shaped integral section of said arm.

* * * * *